United States Patent [19]
Tanaka

[11] Patent Number: 5,825,926
[45] Date of Patent: Oct. 20, 1998

[54] CHARACTER STRING RETRIEVAL METHOD AND CHARACTER STRING RETRIEVAL APPARATUS

[75] Inventor: Hiroshi Tanaka, Kawasaki, Japan

[73] Assignee: Fujitsu Limited, Kawasaki, Japan

[21] Appl. No.: 422,717

[22] Filed: Apr. 12, 1995

[30] Foreign Application Priority Data

Aug. 16, 1994 [JP] Japan ................................ 6-192638

[51] Int. Cl.⁶ ........................... G06K 9/72; G06K 9/00
[52] U.S. Cl. ..................... 382/229; 382/187; 382/181
[58] Field of Search ................... 382/229–231, 382/181–182, 209, 217–218, 224–225, 187–188, 186, 189, 195, 206; 707/1, 2, 500, 532, 541, 542; 345/173, 179, 194–195

[56] References Cited

U.S. PATENT DOCUMENTS

| | | | |
|---|---|---|---|
| 4,516,173 | 5/1985 | Abe et al. ......................... | 358/261.4 |
| 4,547,628 | 10/1985 | Tamura et al. ..................... | 345/141 |
| 4,985,863 | 1/1991 | Fujisawa et al. ................... | 395/605 |
| 5,241,671 | 8/1993 | Reed et al. ........................ | 395/600 |
| 5,345,518 | 9/1994 | Murakami .......................... | 382/232 |
| 5,444,840 | 8/1995 | Froessl ............................ | 395/145 |
| 5,455,871 | 10/1995 | Bloomberg et al. ................ | 382/173 |
| 5,557,789 | 9/1996 | Mase et al. ....................... | 395/600 |
| 5,594,472 | 1/1997 | Date ................................ | 345/194 |

FOREIGN PATENT DOCUMENTS

| | | |
|---|---|---|
| 57-76657 | 5/1982 | Japan . |
| 58-201139 | 11/1983 | Japan . |
| 62-134765 | 6/1987 | Japan . |
| 62-270364 | 11/1987 | Japan . |
| 1-78321 | 3/1989 | Japan . |
| 3-244069 | 10/1991 | Japan . |
| 5-290171 | 11/1993 | Japan . |

OTHER PUBLICATIONS

Yokosawa, "Human–based character string image retrieval from textual images", IEEE International Conf., pp. 1069–1069, vol. 3, Nov. 1989.

*Primary Examiner*—Leo H. Boudreau
*Assistant Examiner*—Bhavesh Mehta
*Attorney, Agent, or Firm*—Armstrong, Westerman, Hattori, McLeland & Naughton

[57] ABSTRACT

When character codes and character patterns coexist in the retrieval character string and/or the retrieval objective data, they are standardized into character patterns, and a character string matching with or similar to the retrieval character string is retrieved from the retrieval objective data. A character code included in the retrieval character string and/or the retrieval objective data is converted into a character pattern by referring to a prepared character pattern dictionary, and by pattern matching between two character patterns, a character string matching with or similar to the retrieval character string is picked up from the retrieval objective data and produced as the result of retrieval.

11 Claims, 16 Drawing Sheets

FIG. 2
PRIOR ART

```
char *search(data, str)
    char *data;
    char *str;

char    *p, *cur;

p = str; cur = data;
    while(*data){
        if(!*p)  return cur;
        if(*data == *p){
            ++data; ++p;
        }else{
            p = str;
            cur = ++data;
        }
    }
    if(*p == '\0')   return cur;
    else    return (char *) 0;
```

FIG. 8

```
struct POINT{
      int    x,y;
};
struct DICT {
      short  code;
      struct POINT   *point;
} dict[];
```

FIG. 9

```
struct CHAR_LIST {
        short    code;
        struct POINT    *pattern;
} string[];
```

FIG. 10

```
match(buf1,m,buf2,n)
struct CHAR_LIST    *buf1, *buf2;
int      m, n;
{
    int    i, j;
    struct CHAR_LIST   *p, *q;

i = j = 0;
    while(i<m && j<n){
        if(match_pattern(&buf1[i],&buf2[j])){
            ++i; ++j;
        }else{
            i = 0; ++j;
        }
    }
    if(i == m)     return j-m;
    return -1;
}
```

FIG. 15

```
match(buf1,m,buf2,n)
struct CHAR_LIST    *buf1,*buf2;
int     m, n;
{
    int     i, j;
    struct CHAR_LIST    *p, *q;
    int     match_pattern(),match_code(), (*func)();

i = j = 0;
    while(i<m && j<n){
        if(buf2[j].pattern){
            func = match_pattern;
        }else{
            func = match_code;
        }
        if((*func)(&buf1[i],&buf2[j])){
            ++i; ++j;
        }else{
            i = 0; ++j;
        }
    }
    if(i == m)      return j-m;
    return -1;
}
```

BEFORE CONVERSION: (ONLY CHARACTER OF "T" IS CHARACTER CODE)

They are watching TV

AFTER CONVERSION:

They are watching V

CHARACTER STRING RETRIEVAL METHOD AND CHARACTER STRING RETRIEVAL APPARATUS

BACKGROUND OF THE INVENTION

1. Field of the Invention

The present invention relates to a method and apparatus for retrieving a character string matching with or similar to a retrieval character string from retrieval objective data.

2. Description of the Related Art

A prior art is described below by referring to a structural diagram of a conventional character string retrieval apparatus shown in FIG. 1. In the conventional character string retrieval apparatus, both the character string to be retrieved and the retrieval objective character group are composed of character codes only, and the data in the English language is, for example, mostly an example of ASCII code. "Character string retrieval" refers to searching of a partial character string matching with or similar to a character string to be retrieved from a retrieval objective character group. A character string retrieval section 11 receives a character string to be retrieved (retrieval character string) and a retrieval objective character group (retrieval objective data) in a form of character codes, and retrieves a partial character string matching with or similar to retrieval character string from the retrieval objective data, and outputs the retrieval result. Herein, both the retrieval character string and the retrieval objective data are strings of character codes, and hence retrieval of matching portion is easily performed, and it can be simply realized.

For example, taking note of the beginning character of retrieval character string, a same character code is searched from the retrieval objective data. When the same character code is found, it is checked whether it is followed by the second character of the retrieval character string. Similarly, character codes in the retrieval character string are sequentially searched, and when all are matched, it is a result of retrieval. As the retrieval result, it is enough to output to position information in the retrieval objective data (for example, which number character from the beginning of the retrieval objective data). An example of the prior art realized in the program of C language is shown in FIG. 2.

Recently, computers and electronic files having a handwriting input function are sold on market. In the information processing apparatus allowing such handwriting input (hereinafter called handwriting input apparatus), keyboard, mouse and the like are not needed, and the screen is directly manipulated, and hence it is noticed as portable information apparatus. In the conventional retrieval method above, since character codes are searched, in the case of character string retrieval function applied in such handwriting input apparatus, the character pattern of the retrieval character string inputted by handwriting must be converted into a character code. Accordingly, handwritten character recognizing function is required in the handwriting input apparatus. There are, however, still many defects in the handwritten character recognizing function, and it is far from perfect recognition ability. Accordingly, recognition errors occur often, and corrections of recognition errors are needed in handwritten character input. In the conventional method, therefore, it is annoying that the handwritten input characters must be once recognized into character codes.

In the handwriting input apparatus, various data can be inputted by handwriting, and, for example, handwritten memo is realized in an electronic appliance. Since the manipulation for character recognition is annoying at the time of input, the handwritten memo that can be read by man may be saved directly in the handwritten pattern (without character recognition). However, when the handwritten pattern itself is saved, retrieval function cannot be utilized later when searching required data. In the conventional method, since the memo was saved in character codes, the retrieval function could be utilized, and it was convenient when searching necessary information or sorting information later. On the other hand, in order to save in character codes, keyboard input or handwritten character recognition is needed, which requires due labor as mentioned above.

Furthermore, the data handled by the handwriting input apparatus includes not only the information inputted by the user by handwriting, but also character pattern data of various documents read by an optical reading apparatus (scanner). In this way, when the documents are saved as image of character patterns, ordinary character string retrieval cannot be applied. Character recognition process is also needed when converting the data read by the scanner into character codes. This is realized by the recognition technology known as OCR, but the recognition errors are serious problems, and it is far from practical for general users.

Thus, when character patterns such as handwritten characters are included in the retrieval character string or the retrieval objective data, the conventional character string retrieval cannot be applied. To apply the conventional technology of character string retrieval, character recognition technology is needed when converting all character patterns into character codes, and its operation is difficult for general users.

SUMMARY OF THE INVENTION

It is hence a primary object of the invention to provide a character string retrieval method and a character string retrieval apparatus allowing the user to retrieve easily a character string matching with or similar to a retrieval character string from retrieval objective data, when character codes and character patterns coexist in the retrieval character string and/or the retrieval objective data.

It is another object of the invention to provide a character string retrieval method and a character string retrieval apparatus capable of retrieving a character string more efficiently, by combining a pattern matching after character pattern conversion with the conventional character code matching.

In the invention, when character codes and character patterns coexist in the retrieval character string and/or the retrieval objective data, they are standardized in character patterns, and a character string matching with or similar to the retrieval character string is retrieved from the retrieval objective data. The character codes included in the retrieval character string and/or the retrieval objective data are converted into character patterns by referring to a prepared character pattern dictionary, and by a pattern matching of character patterns, a character string matching with or similar to the retrieval character string is retrieved from the retrieval objective data.

The problem of the prior art discussed above is derived from the fact that it requires the process of converting the character patterns such as handwritten characters into character codes. It is therefore preferred to use the character patterns directly in retrieval. When the character code row is contained in the retrieval character string and/or the retrieval objective data, it is not possible to retrieve by pattern matching of character patterns only, and in the invention, therefore, the portion expressed by string of character codes in the retrieval character string and/or the retrieval objective data is converted into character patterns, and the character patterns are compared by employing the pattern matching technology, so that a matching or similar character string is retrieved.

In this manner, the intended character string retrieval is possible with pattern matching alone. When retrieving the target character pattern by pattern matching, a perfectly identical pattern may not be always found, and hence a similar pattern is retrieved. This is same as pattern recognition. In the character recognition, however, correct retrieval is not expected unless a correct character is obtained, but in the case of pattern matching, similar patterns can be retrieved, so that the user can pick up the target among them.

In the invention, moreover, when character codes and the character patterns coexist in the retrieval character string and retrieval objective data, the character pattern matching after character pattern conversion mentioned above is combined with the known character code matching. As a result, if failing in character pattern matching, retrieval process can be continued by character code matching, so that the character string may be retrieved efficiently.

Furthermore, in the invention, when converting character codes into character patterns, the information for positioning the character pattern is included in the character patterns. Thus, character positioning is easy, and matching errors can be prevented, and the matching processing time can be cut short.

The above and further objects and features of the invention will more fully be apparent from the following detailed description with accompanying drawings.

BRIEF DESCRIPTION OF THE DRAWINGS

FIG. 2 is a diagram showing a program example in the conventional character string retrieval apparatus.

FIG. 8 is a diagram showing a configuration example of a character pattern dictionary in the character string retrieval apparatus of the invention.

FIG. 9 is an internal composition diagram of retrieval character string and retrieval objective data in the character string retrieval apparatus of the invention.

FIG. 10 is a diagram showing a practical example of a pattern matching section in the character string retrieval apparatus of the invention.

FIG. 15 is a diagram showing another practical example of the pattern matching section in the character string retrieval apparatus of the invention.

DESCRIPTION OF THE PREFERRED EMBODIMENTS

Figure 1:
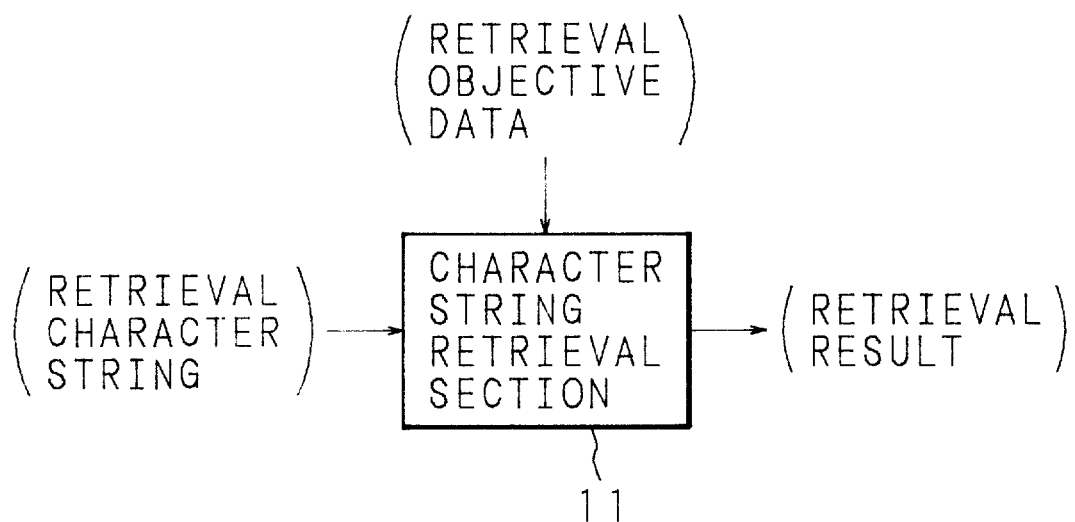
FIG. 1 is a block diagram of a conventional character string retrieval apparatus.

Referring now to the drawings, some of the embodiments of the invention are described in detail below.

(First embodiment)

Figure 3:
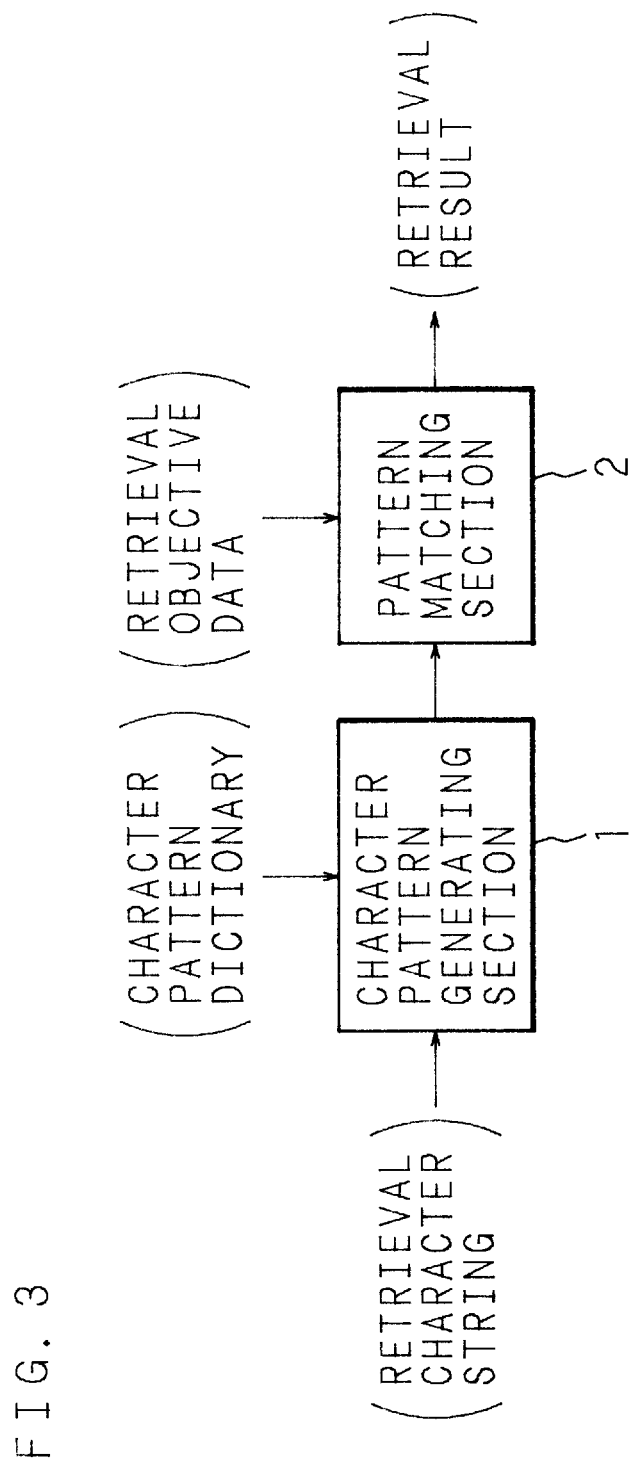
FIG. 3 is a block diagram of a character string retrieval apparatus in a first embodiment of the invention.

The character string retrieval apparatus in the first embodiment of the invention is described below. In the first embodiment, it is assumed that the retrieval character string includes character codes and that the retrieval objective data is composed of character patterns only. The constitution of the first embodiment is shown in FIG. 3. In FIG. 3, reference numeral 1 denotes a character pattern generating section for converting a character code included in the input retrieval character string into a character pattern by referring to a prepared character pattern dictionary, and the character pattern generating section 1 outputs the generated character pattern to a pattern matching section 2. In the pattern matching section 2, the character pattern from the character pattern generating section 1 and the character pattern of the input retrieval objective data are matched, and a matching or similar pattern is produced as result of retrieval.

Figure 4:
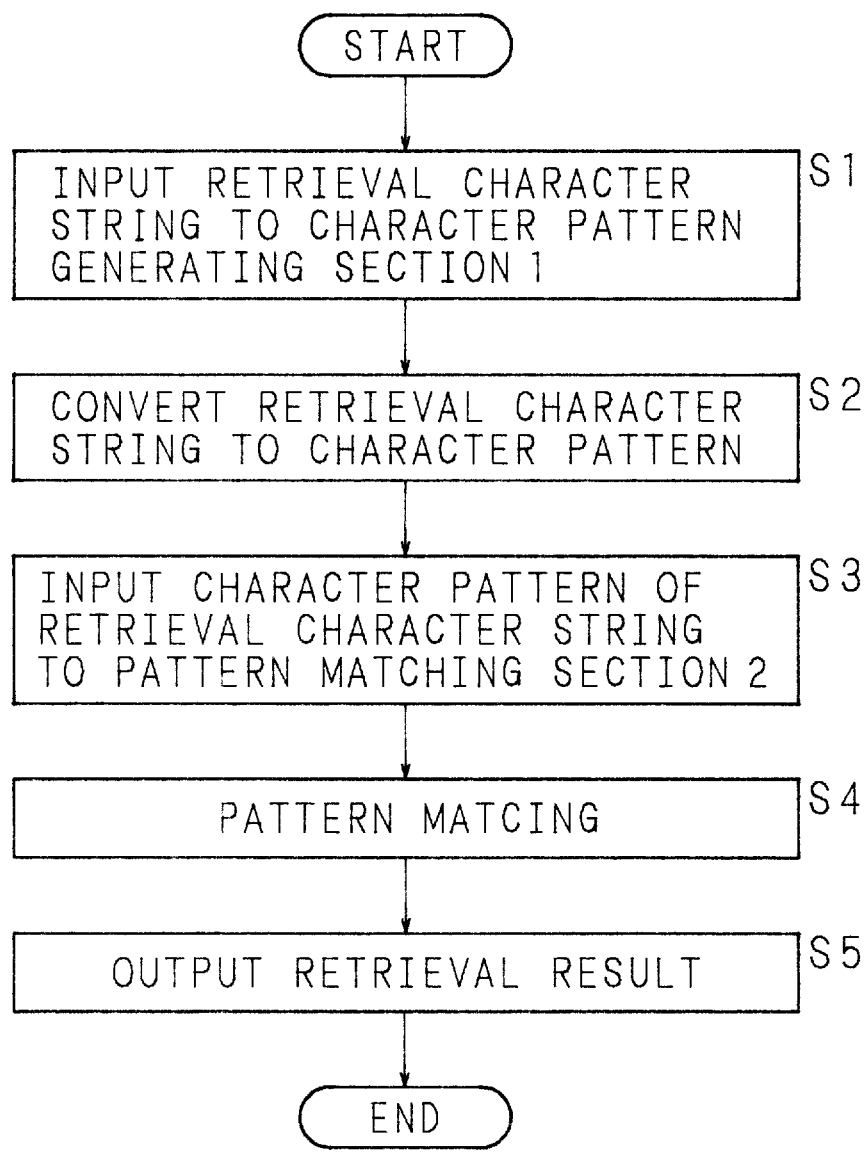
FIG. 4 is a flow chart showing a processing procedure of the character string retrieval apparatus in the first embodiment.

The operation is described below. FIG. 4 is a flow chart showing the procedure of processing operation in the first embodiment. A retrieval character string is inputted to the character pattern generating section 1 as a character code string (step S1), and is converted into a string of character patterns in the character pattern generating section 1 (step S2). At this time of conversion, character patterns corresponding to character codes (for example, character font data) are needed, and the prepared character pattern dictionary is referred to. The retrieval character string converted into character pattern is inputted to the pattern matching section 2 (step S3), and by matching the character patterns, a similar pattern is retrieved from the retrieval objective data (step S4). Finally, the position containing the pattern more similar than in the predetermined standard among the retrieval objective data is picked up as result of retrieval (step S5).

(Second embodiment)

Figure 5:
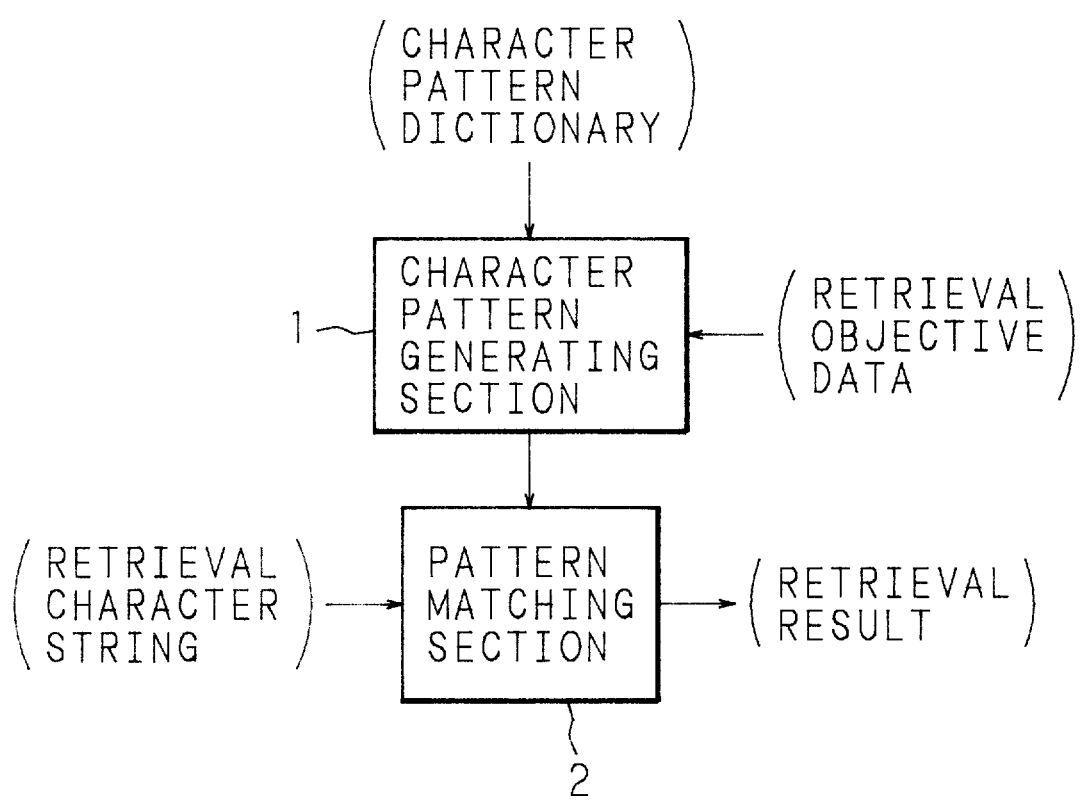
FIG. 5 a is a block diagram of a character string retrieval apparatus in a second embodiment of the invention.

The character string retrieval apparatus in the second embodiment of the invention is described below. In the second embodiment, it is assumed that the retrieval objective data includes character codes and that the retrieval character string is composed of character patterns only (for example, handwritten patterns). The configuration of the second embodiment is shown in FIG. 5. In FIG. 5, the character patterns generation section 1 converts the character code included in the input retrieval objective data into a character pattern by referring to the prepared character pattern dictionary, and outputs the generated character pattern to the pattern matching section 2. In the pattern matching section 2, the character pattern from the character pattern generating section 1 and the character pattern of the input retrieval character string are matched, and a matching or similar pattern is produced as result of retrieval.

Figure 6:
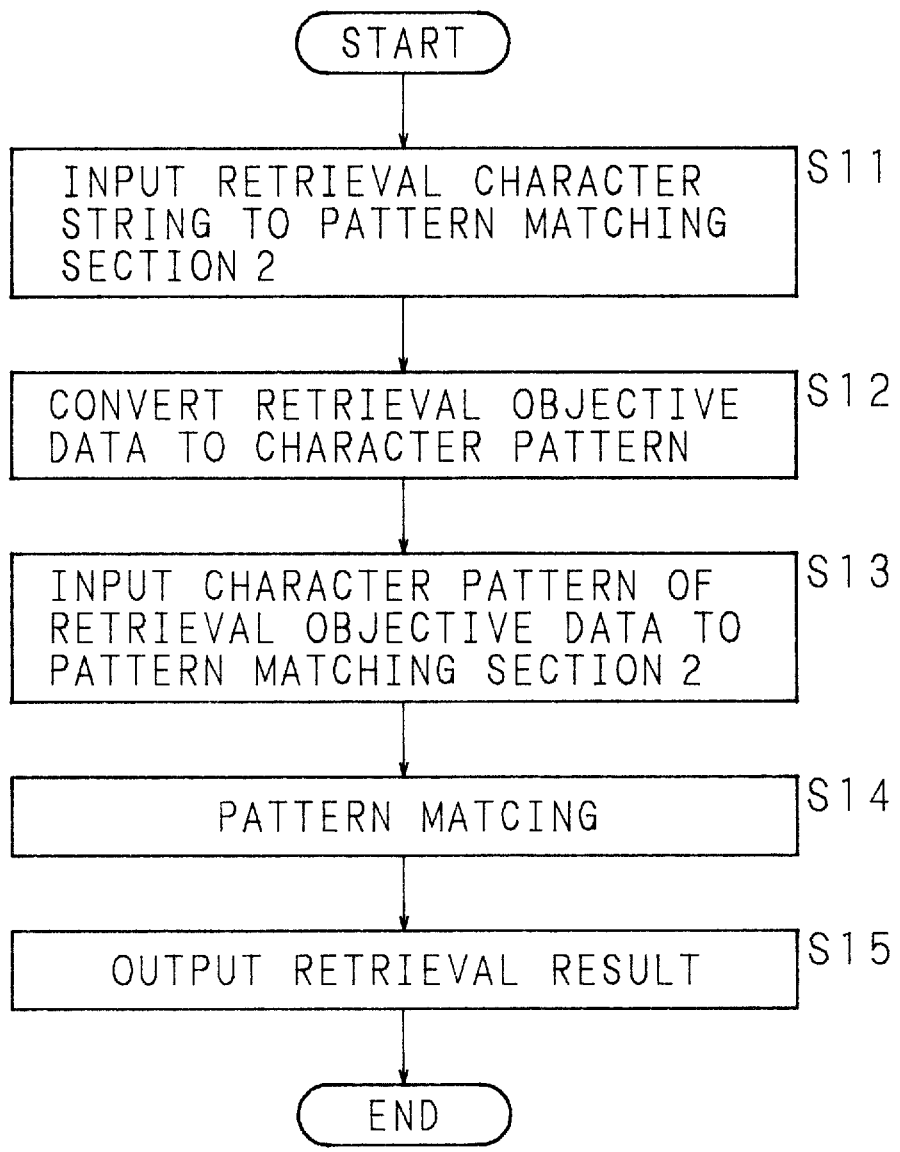
FIG. 6 is a flow chart showing a processing procedure of the character string retrieval apparatus in the second embodiment.

The operation is described below. FIG. 6 is a flow chart showing the procedure of processing operation of the second embodiment. First, a retrieval character string is inputted to the pattern matching section 2 in a form of character pattern (step S11). The retrieval character string may be, for example, a handwritten pattern written by a stylus pen. On the other hand, the character code existing in the retrieval objective data is converted into a character pattern in the character pattern generating section 1 (step S12). At this time of conversion, the pattern stored in the character pattern dictionary is used. The retrieval objective data obtained after conversion does not contain character code. The retrieval objective data converted into character pattern is inputted to the pattern matching section 2 (step S13), and by pattern matching of mutual character patterns, a pattern similar to the retrieval character string is retrieved from the retrieval objective data (step S14). Finally, the position containing the pattern more similar than in the predetermined standard among the retrieval objective data is picked up as result of retrieval (step S15,).

The character pattern generating section 1, the character pattern dictionary, and the pattern matching section 2 used in the first and second embodiments are described in detail below.

Figure 7:
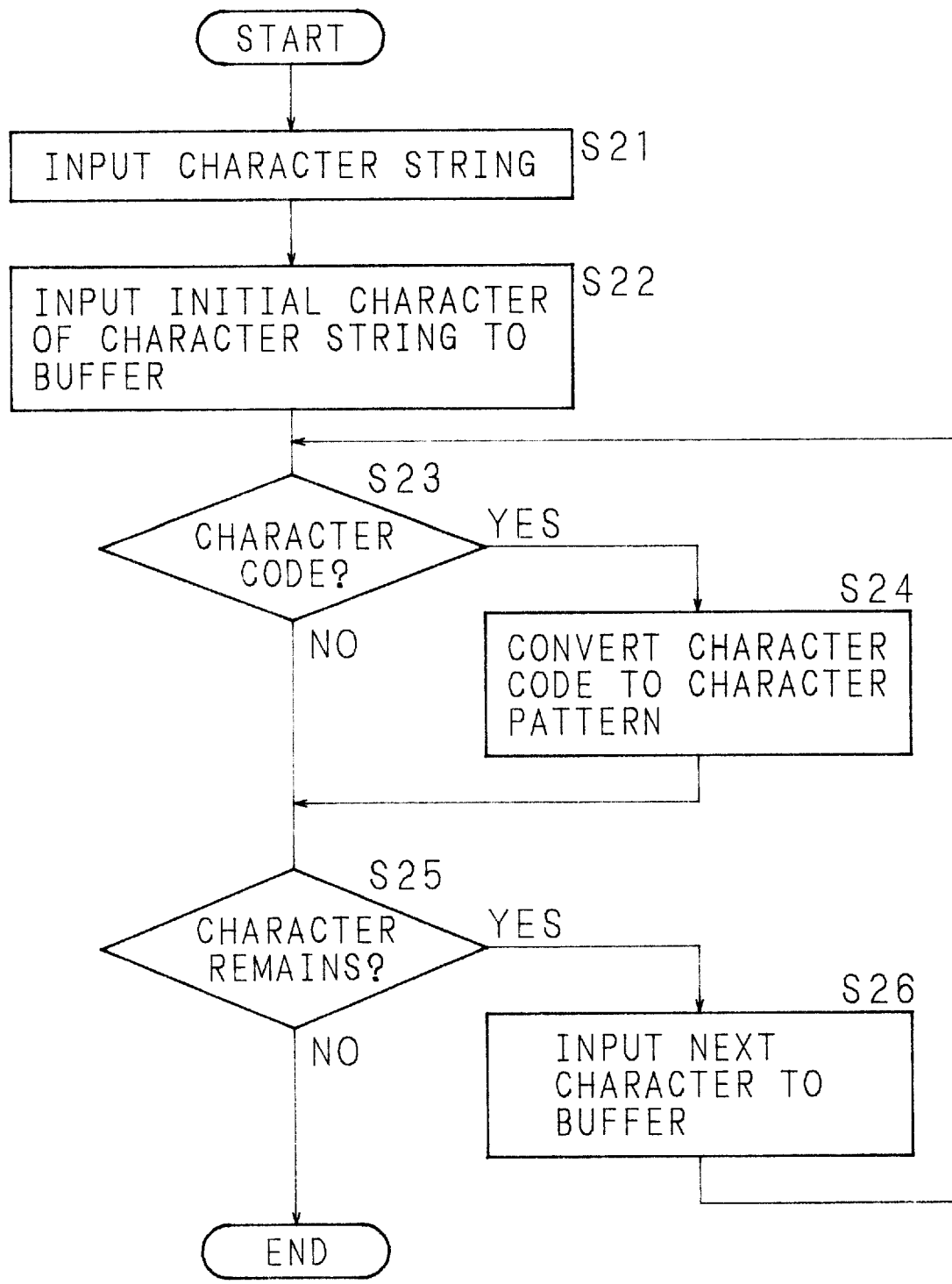
FIG. 7 is a flow chart showing a processing procedure of a character pattern generating section in the character string retrieval apparatus of the invention.

First, the character pattern generating section 1 is described. The character pattern generating section 1 converts the portion of character code contained in the input character string into character pattern, and generates a pattern of character string. The procedure of its processing operation is shown in a flow chart in FIG. 7. A character string is inputted (step S21), and a first character of the character string is inputted to the buffer (step S22). Judging if the input character is a character code or not (step S23), when it is a character code, the character code is converted into a character pattern (step S24), thereby advancing to step S25, and when it is not a character code, the operation directly advances to step S25. Judging if there is any remaining character not inputted to the buffer or not (step S25), when remaining, the next character is inputted to the buffer (step S26), thereby returning to step S23, and when not remaining, processing is terminated. Concerning each character of the input character string, if it is a character code, it is converted into a character pattern.

To convert a character code into a character pattern, a character pattern corresponding to the character code is read out from the character pattern dictionary, and is inserted into the position containing the character code. A more specific realizing method cannot be explained unless the storage format of the retrieval character string and the retrieval objective data is determined, and hence it will be described later.

A character pattern direction is realized on an ordinary information storage unit (for example, a magnetic disk). Reading of a pattern corresponding to the character code is the operation for reading out a corresponding item in the data, which is realized by software. A character pattern dictionary is realized, for example, by a structure as shown in FIG. 8. A variable dict [ ] denotes a character pattern dictionary. Herein, a character pattern is expressed by a string of coordinate points. Herein, supposing that values of coordinate points will never be 0xfffe, 0xffff (expressed in C language in hexadecimal notation) absolutely, and assuming 0xfffe to be the end point of character stroke and 0xffff to be the end point of character point, a character pattern can be expressed in a string of coordinate points.

In the pattern matching section 2, a portion matching with (or similar to) the retrieval character string is searched from the retrieval objective data by pattern matching. No output is produced if similar portion is not found.

FIG. 9 is an example of internal composition for storing retrieval character string and retrieval objective data shown in a structure of C language. Herein, string [ ] denotes an array of variables in which data is stored. Usually, data expressed in character codes only is expressed in a simple byte string (example: char string [ ];, but in this example, considering the possibility that the character code may be a multi-language code, the member code of the structure is of short type. It is also possible that the character may be a character pattern, instead of character code, there is also a member of struct POINT type. If the code is 0, reference is made to pattern, and a character pattern is obtained. To the contrary, if the pattern is 0, reference is made to code if both are 0, the character is blank. Usually, a blank character indicates the end of a character string. Herein, too, until blank data appears, it is regarded as one character string . If neither code nor pattern is 0, the character may have both data. For example, when a character string expressed in character code is inputted to the pattern is stored in the character pattern generating section 1, the converted character pattern field which has been hitherto 0 (actually, a memory region for storing the character pattern is provided in some other place, and the pointer to that region is stored in the pattern). At this time, unless the value of code field is cleared, both the character code and the character pattern of same character are obtained.

In the pattern matching section 2, the pattern field in the retrieval character string and the pattern field of retrieval objective data are matched. As the matching method of two character patterns, any conventional matching algorithm may be employed. An example of realizing the pattern matching section 2 in a program is shown in FIG. 10. Herein, a retrieval character string is stored in buf1, and a retrieval objective data in buf2. Specifically, m and n are respective data lengths. The function match pattern called inside compares character patterns stored in two character pattern fields, and returns TRUE when judged to be matching or very similar, and returns FALSE otherwise. The function match itself retrieves the retrieval character string out of the retrieval objective data, and returns the position (which number character in the retrieval objective data) if found, and returns −1 if not found.

(Third embodiment)

Explained next is the character string retrieval apparatus in the third embodiment of the invention. The third embodiment is constituted by combining the first embodiment and the second embodiment, and it is supposed that both retrieval character string and retrieval objective data are a mixture of character codes and character patterns. The constitution of the third embodiment is more flexible because the types of character strings (character code, character pattern) are arbitrary.

Figure 11:
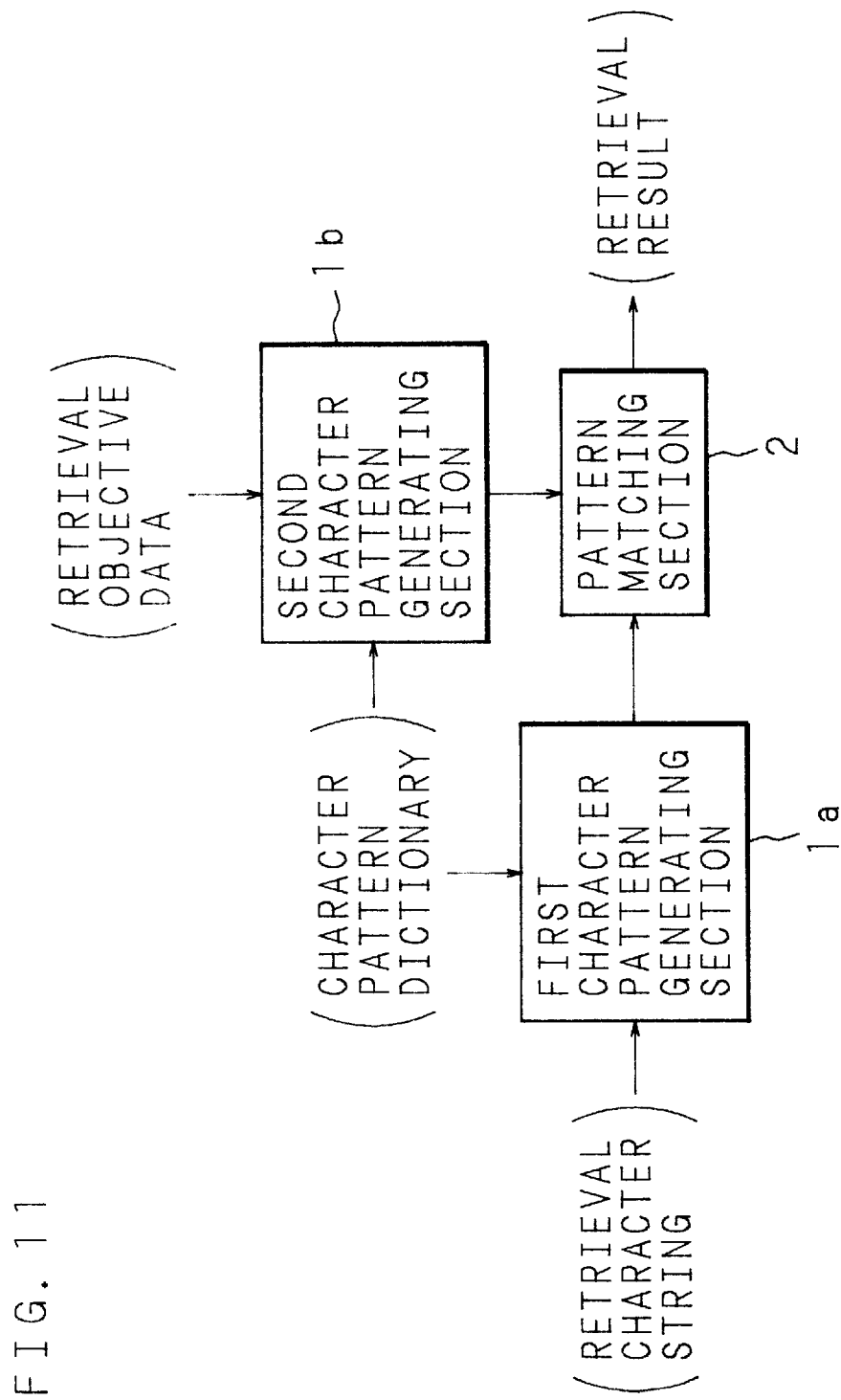
FIG. 11 is a block diagram of a character string retrieval apparatus in a third embodiment of the invention.

FIG. 11 shows the constitution of the third embodiment. A first character pattern generating section 1a converts the character code contained in the input retrieval character string into a character pattern by referring to a prepared character pattern dictionary, and outputs the generated character pattern to a pattern matching section 2. A second character pattern generating section 1b converts the character code contained in the input retrieval objective data into a character pattern by referring to the character pattern dictionary, and outputs the generated character pattern to the pattern matching section 2. The pattern matching section 2 matches the character pattern from the first character pattern generating section 1a and the character pattern from the second character pattern generating section 1b, and outputs a matching or similar pattern as result of retrieval.

Figure 12:
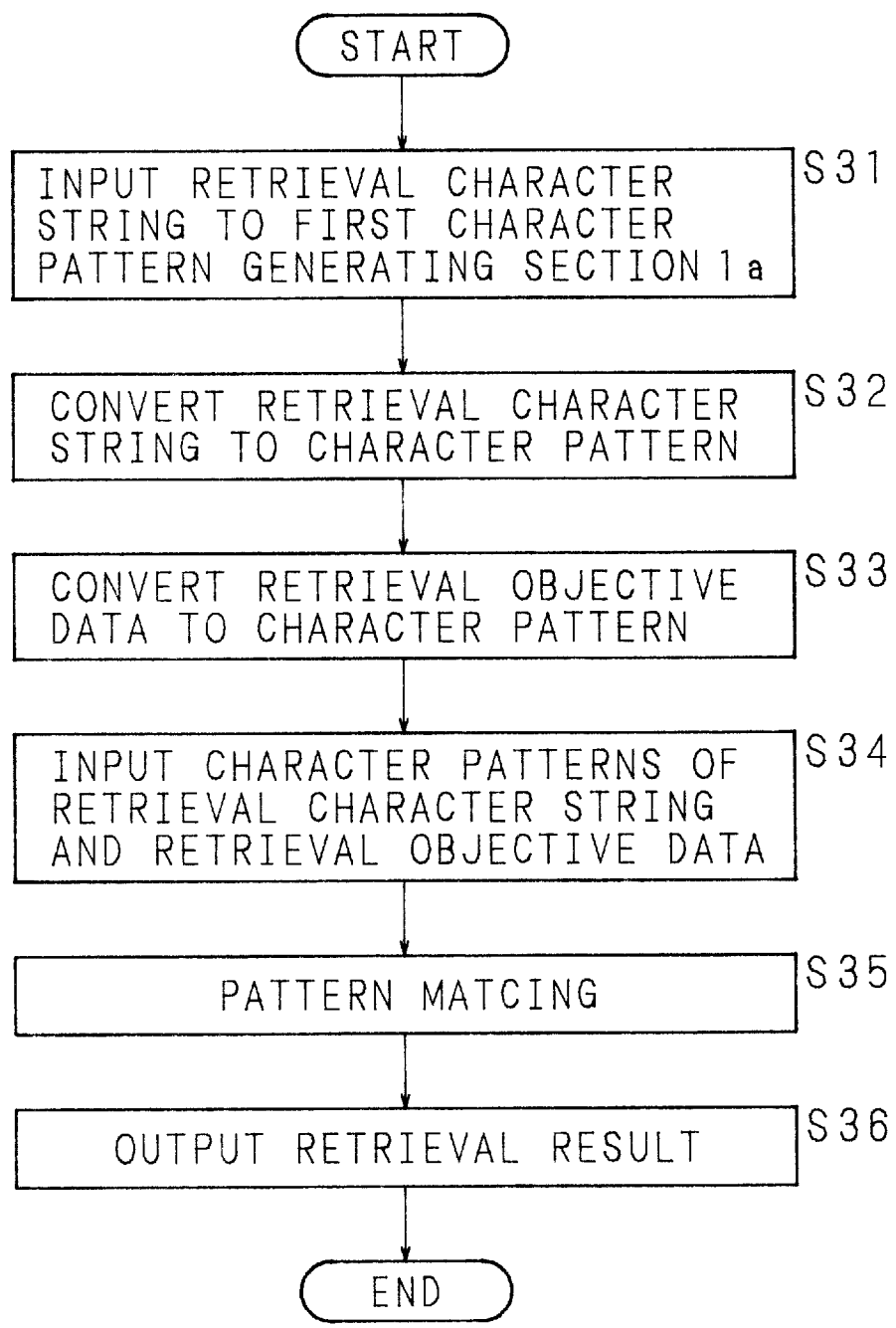
FIG. 12 is a flow chart showing a processing procedure of the character string retrieval apparatus in the third embodiment.

The operation is described below. FIG. 12 is a flow chart showing the procedure of processing operation of the third embodiment. First, a retrieval character string is inputted to the first character pattern generating section 1a (step S31), and if a character code string is included in the retrieval character string, it is converted into a character pattern (step S32). If character code is not included, it is outputted directly without being converted. On the other hand, the character code string included in the retrieval objective data is converted into a character pattern in the second character pattern generating section 1b (step S33). The retrieval character string whose character code string is converted into the character pattern and the retrieval objective data are inputted to the pattern matching section 2 (step S34), and a similar portion is retrieved (step S35). As a result, the portion similar to the retrieval character string among the retrieval objective data is produced as result of retrieval (step S36). The first and second character pattern generating sections 1a, 1b refer to the same character pattern dictionary to generate character patterns. Therefore, a same character code is converted into a same character pattern, two character patterns generated from a same character code are perfectly matched at the time of pattern matching.

In the third embodiment, the character pattern generating section is divided into the first character pattern generating section 1a and the second character pattern generating section 1b, but they operate exactly the same, and may be considered to be same as the one shown in the first and second embodiment.

(Fourth embodiment)

The character string retrieval apparatus in the fourth embodiment of the invention is described. In the fourth embodiment, matching of retrieval character string and retrieval objective data is changed over between character pattern matching and character code matching.

Figure 13:
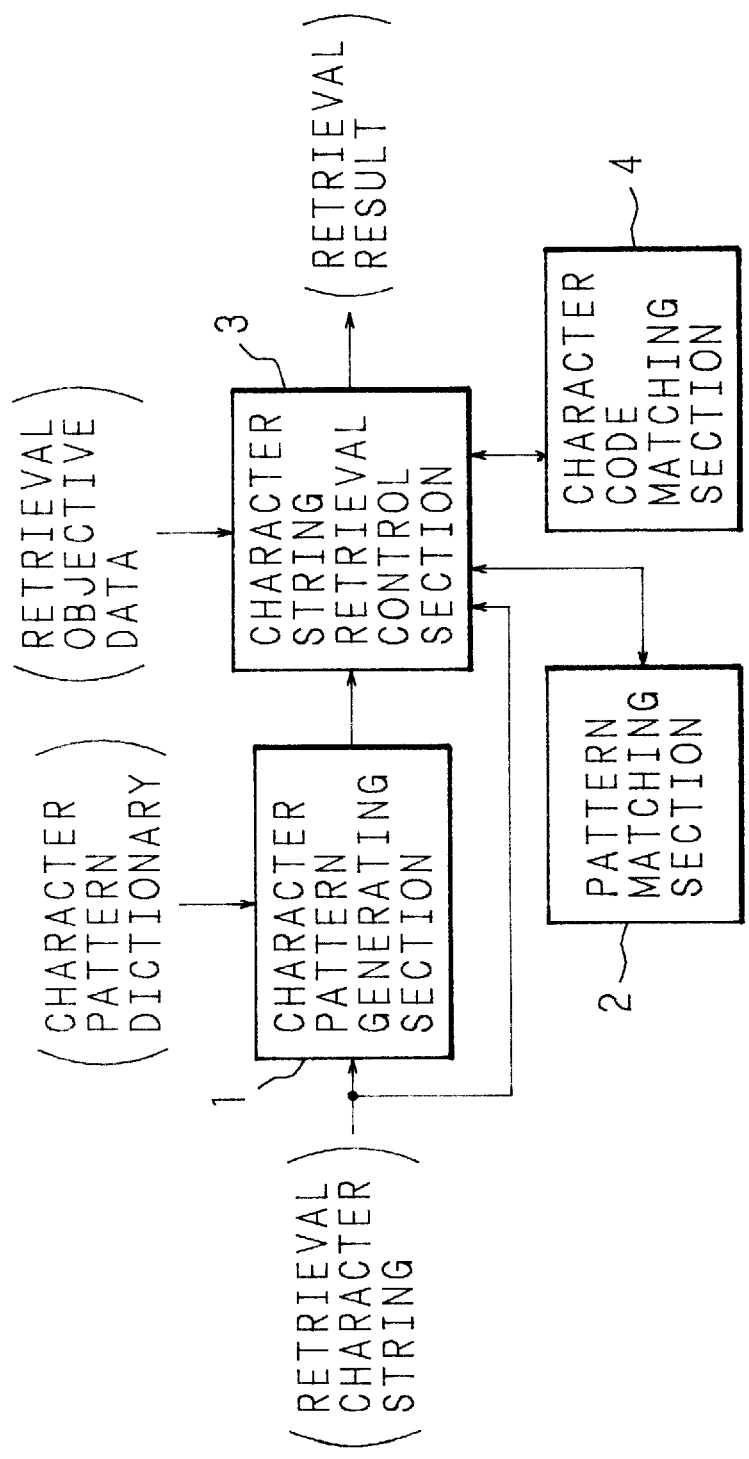
FIG. 13 is a block diagram of a character string retrieval apparatus in a fourth embodiment of the invention.

FIG. 13 shows the constitution of the fourth embodiment. A character pattern generating section 1 converts the character code included in the input retrieval character string into a character pattern by referring to a prepared character pattern dictionary, and outputs the generated character pattern to a character string retrieval control section 3. The character string retrieval control section 3 starts up a pattern matching section 2 and matches the patterns between the character pattern from the character pattern generating section 1 and the character pattern of the retrieval objective data, or starts up a character code matching section 4 and matches the character codes between the retrieval character string before conversion and the retrieval objective data, and outputs a matching or similar pattern as result of retrieval. Two methods of matching process in the character string retrieval control section 3 is changed over dynamically.

Figure 14:
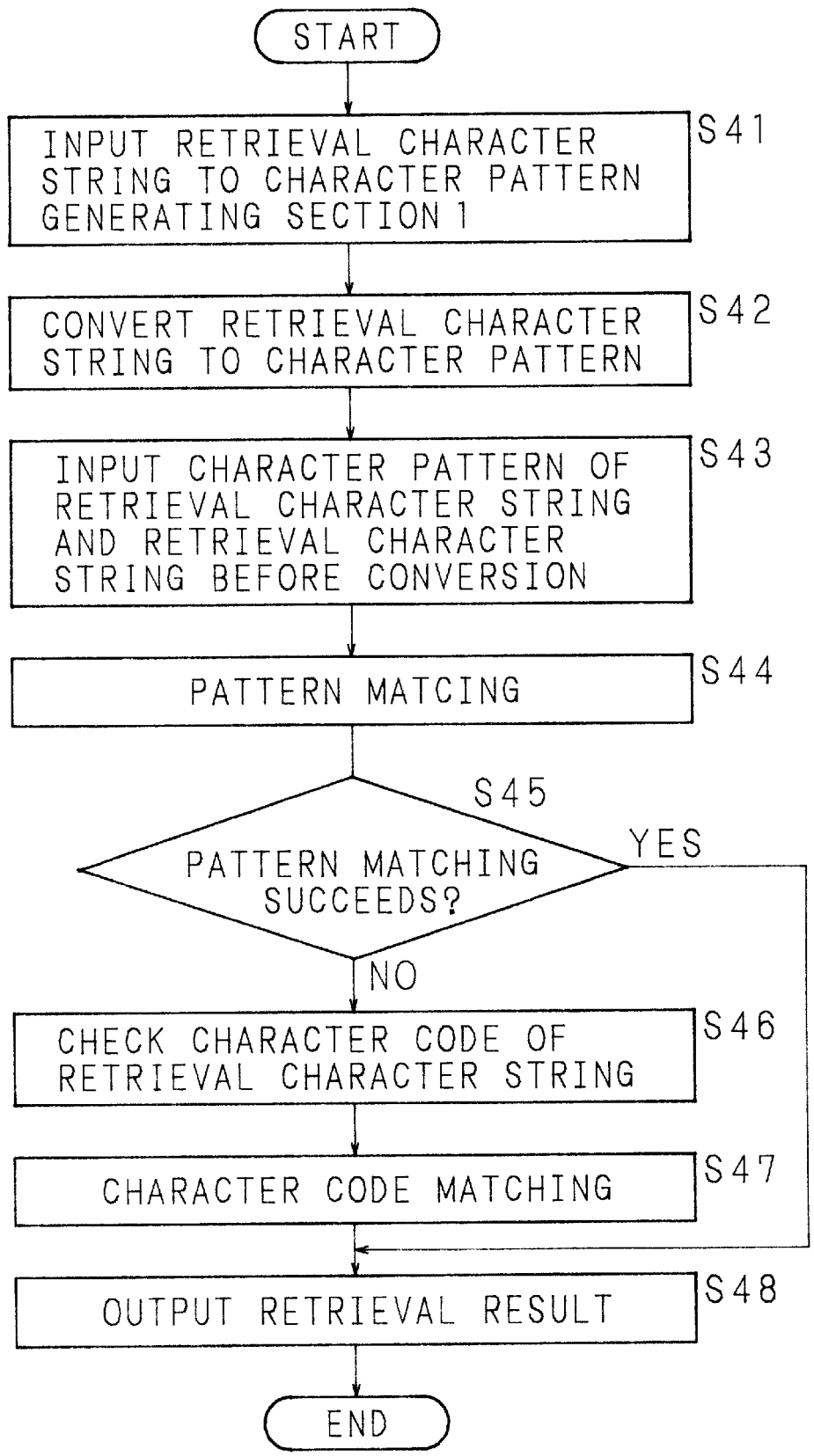
FIG. 14 is a flow chart showing a processing procedure of the character string retrieval apparatus in the fourth embodiment.

The operation is described below. FIG. 14 is a flow chart showing the procedure of processing operation of the fourth embodiment. A retrieval character string is inputted to the character pattern generating section 1 same as in the first embodiment (step S41), and the portion of character code string is converted into a character pattern (step S42). The result of conversion is inputted to the character string retrieval control section 3, and at the same time the retrieval character string before conversion (possibly containing character code string) is also inputted to the character string retrieval control section 3 (step S43). In the character string retrieval control section 3, matching of the retrieval objective data and the retrieval character string converted into character pattern is performed by character pattern (step S44). The character pattern matching at this time is realized by calling the pattern matching section 2. Judging if this matching is successful or not (step S45), the operation advances to step S48 if successful, and to step S46 if not successful. When a character code appears in the retrieval objective data, matching between two character patterns fails, but in this case, in the input retrieval character string, it is investigated if the portion failing in matching has been character code or not (step S46). Accordingly, matching of the retrieval character string itself and the retrieval objective data is performed by character code (step S47). The character code matching at this time is realized by calling the character code matching section 4. Finally, the portion similar to the retrieval character string in the retrieval objective data is outputted as result of retrieval (step S48). Thus, in the fourth embodiment, if failing in character pattern matching, as far as the character codes are matched, the matching is successful so far, and the subsequent matching is continued.

In the fourth embodiment, when matching the character strings, the matching function must be changed over by judging if the characters to be compared are character codes or character patterns. This is realized by extending the embodiment of the pattern matching section already explained (see FIG. 10). FIG. 15 shows an example of a program in C language in the fourth embodiment. Herein, the function match code compares two character code fields, and returns TRUE if matched, and FALSE if not matched.

In the character pattern generating section 1, the character code in the input retrieval character string is converted into a character pattern, but the original character code is not erased but is left over. This is to realize a route in which the retrieval character string itself is inputted to the character string retrieval control section 3 in the block diagram in FIG. 13. In the character string retrieval control section 3, the matching function is changed over depending on whether the characters to be compared are character codes or character patterns, which is realized by the portion for changing over (substituting for variable func) between the function match pattern and the function match code in the program in FIG. 15.

(Fifth embodiment)

The character string retrieval apparatus of the fifth embodiment of the invention is described below. The fifth embodiment is an example for facilitating pattern matching in the foregoing first to fourth embodiments.

Figure 16:
FIG. 16 is a diagram showing an operation example of a character string retrieval apparatus in a fifth embodiment of the invention.

In the character pattern generating section, using the pattern stored in the character pattern dictionary, a character code is converted into a character pattern, and moreover a certain special pattern can be generated, such as a pattern overlaying a square frame surrounding a character around the character pattern as shown in FIG. 16. As a method of realizing, a special pattern for overlaying (a square frame herein) is stored in the character pattern generating section, and when generating a character pattern, the special pattern is buried on the original character pattern. As another method of realizing, a character pattern on which a special pattern is buried may be registered previously in the character pattern dictionary. In any method, it is possible to realize with software.

Such special pattern does not appear in the character pattern of an ordinary document, and it may be considered to match only with the character pattern generated by using the character pattern generating section. Herein, by matching the internal character pattern itself, character positioning is not necessary. When such special pattern is overlaid, if the position is slightly deviated and the matching distance is very long, the character positioning is possible by simple processing. It is hence possible to suppress the increase of matching error and calculation time caused by conversion from character code string into character pattern.

As described so far, in the invention, the portion expressed by array of character codes in the retrieval character string and/or the retrieval objective data is converted into a character pattern, and a matching or similar character string is retrieved by pattern matching technology, and therefore when character codes and character patterns are mixed in the retrieval character string and/or the retrieval objective data, the user can easily retrieve a desired character string from the retrieval objective data.

In the invention, the character string retrieval for searching the retrieval character string from the retrieval objective data can be performed whether character codes or character patterns are included. As a result, the retrieval objective data may be selected freely, and various data can be retrieved. Moreover, the data format of the retrieval character string can be freely selected, and hence the controllability is enhanced also when retrieving a character string by, for example, handwritten characters.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A character string retrieval method for retrieving at least one of a matching character string and a similar character string, from a retrieval objective character group, to a retrieval character string, the retrieval character string and the retrieval objective character group each having a character code portion and a character pattern portion, comprising the steps of:

converting the character code portion in the retrieval objective character group and the character code portion in the retrieval character string into character patterns;

performing a pattern matching using the character patterns converted by said converting step and the character pattern portions of the retrieval objective character group and the retrieval character string; and retrieving the at least one of the matching character string and the similar character string from the retrieval objective character group based on a result of said performing step.

2. A character string retrieval method of claim 1, wherein the character patterns are composed of handwritten characters.

3. A character string retrieval method of claim 1, wherein the character code portions are converted into the character patterns by referring to a character pattern dictionary.

4. A character string retrieval method for retrieving at least one of a matching character string and a similar character string, from a retrieval objective character group, to a retrieval character string, the retrieval character string having a character code portion and a character pattern portion, comprising the steps of:

converting the character code portion in the retrieval character string into a character pattern;

performing a pattern matching using the character pattern converted by said converting step and the character pattern portion of the retrieval character string and the retrieval objective character group composed of character patterns; and retrieving the at least one of the matching character string and the similar character string from the retrieval objective character group based on a result of said performing step.

5. A character string retrieval method for retrieving at least one of a matching character string and a similar character string, from a retrieval objective character group, to a retrieval character string, the retrieval objective character group having a character code portion and a character pattern portion, comprising the steps of:

converting the character code portion in the retrieval objective character group into a character pattern;

performing a pattern matching using the character pattern converted by said converting step and the character pattern portion of the retrieval objective character group and the retrieval character string composed of character patterns; and retrieving the at least one of the matching character string and the similar character string from the retrieval objective character group based on a result of said performing step.

6. A character string retrieval method for retrieving at least one of a matching character string and a similar character string, from a retrieval objective character group, to a retrieval character string, the retrieval character string and the retrieval objective character group each having a character code portion and a character pattern portion, comprising the steps of:

converting the character code portion in the retrieval character string into a character pattern;

converting the character code portion in the retrieval objective character group into a character pattern;

performing a pattern matching using the character patterns converted by said converting steps and the character pattern portions of the retrieval character string and the retrieval objective character group; and retrieving the at least one of the matching character string and the similar character string from the retrieval objective character group based on a result of said performing step.

7. A character string retrieval apparatus for retrieving at least one of a matching character string and a similar character string, from a retrieval objective character group, to a retrieval character string, the retrieval character string and the retrieval objective character group each having a character code portion and a character pattern portion, comprising:

converting means for converting the character code portion in the retrieval objective character group and the character code portion in the retrieval character string into character patterns; and means for retrieving the at least one of the matching character string and the similar character string to the retrieval character string by pattern matching using the character patterns converted by said converting means and the character pattern portions of both the retrieval character string and the retrieval objective character group.

8. A character string retrieval apparatus of claim 7, wherein said converting means converts the character code portions into the character patterns by referring to a character pattern dictionary.

9. A character string retrieval apparatus for retrieving at least one of a matching character string and a similar character string, from a retrieval objective character group composed of character patterns, to a retrieval character string including a character code portion and a character pattern portion, comprising:

converting means for converting the character code portion in the retrieval character string into a character pattern; and means for retrieving the at least one of the matching character string and the similar character string to the retrieval character string by pattern matching the character pattern converted by said converting means and the character pattern portion of the retrieval character string with the character patterns of the retrieval objective character group.

10. A character string retrieval apparatus for retrieving at least one of a matching character string and a similar character string, from a retrieval objective character group including a character code portion and a character pattern portion, to a retrieval character string composed of character patterns, comprising:

converting means for converting the character code portion in the retrieval objective character group into a character pattern; and means for retrieving the at least one of the matching character string and the similar character string to the retrieval character string by pattern matching the character pattern converted by said converting means and the character pattern portion of the retrieval objective character group with the character patterns of the retrieval character string.

11. A character string retrieval apparatus for retrieving at least one of a matching character string similar character string, from a retrieval objective character group, to a retrieval character string, the retrieval character string and the retrieval objective character group each having a character code portion and a character pattern portion comprising:

first converting means for converting the character code portion in the retrieval character string into a character pattern; and second converting means for converting the character code portion in the retrieval objective character group into a character pattern;

means for retrieving the at least one of the matching character string and the similar character string to the retrieval character string, by pattern matching the character patterns and character pattern portions of both the retrieval character string and the retrieval objective character group.

* * * * *